(12) United States Patent
Zou et al.

(10) Patent No.: US 11,573,363 B2
(45) Date of Patent: Feb. 7, 2023

(54) DISPLAY APPARATUS

(71) Applicant: BOE Technology Group Co., Ltd., Beijing (CN)

(72) Inventors: Xiangxiang Zou, Beijing (CN); Xinxin Mu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 234 days.

(21) Appl. No.: 16/970,718

(22) PCT Filed: Feb. 18, 2020

(86) PCT No.: PCT/CN2020/075735
§ 371 (c)(1),
(2) Date: Aug. 18, 2020

(87) PCT Pub. No.: WO2020/177528
PCT Pub. Date: Sep. 10, 2020

(65) Prior Publication Data
US 2021/0223458 A1 Jul. 22, 2021

(30) Foreign Application Priority Data
Mar. 5, 2019 (CN) .......................... 201910163533.4

(51) Int. Cl.
G06F 3/042 (2006.01)
F21V 8/00 (2006.01)
G06F 3/01 (2006.01)

(52) U.S. Cl.
CPC ......... *G02B 6/0045* (2013.01); *G02B 6/0075* (2013.01); *G06F 3/017* (2013.01); *G06F 3/042* (2013.01)

(58) Field of Classification Search
CPC .. G02B 6/0045; G02B 6/0075; G02B 6/4214; G06F 3/017; G06F 3/042; G06F 1/1601;
(Continued)

(56) References Cited

U.S. PATENT DOCUMENTS

| 10,663,640 B2 | 5/2020 | Song et al. |
| 2015/0084927 A1 | 3/2015 | Wyrwas et al. |

(Continued)

FOREIGN PATENT DOCUMENTS

| CN | 202275238 U | 6/2012 |
| CN | 103557503 A | 2/2014 |

(Continued)

OTHER PUBLICATIONS

Office Action dated Apr. 9, 2020, issued in counterpart CN Application No. 201910163533.4, with English Translation. (21 pages).

(Continued)

*Primary Examiner* — Patrick N Edouard
*Assistant Examiner* — Joseph P Fox
(74) *Attorney, Agent, or Firm* — WHDA, LLP

(57) ABSTRACT

Embodiments of the present disclosure disclose a display apparatus, including: a display panel; a frame, provided at a side part of the display panel and including a light-transmitting area; a plurality of light guide structures spaced apart from each other, one end of each light guide structure having a photosensitive area, the photosensitive area being provided opposite to the light-transmitting area so that light is irradiated on the photosensitive area through the light-transmitting area; and an optical device provided at an end of each light guide structure away from the photosensitive area, wherein each of the light guide structures is configured to transmit the light irradiated on the photosensitive area to the optical device.

19 Claims, 10 Drawing Sheets

(58) Field of Classification Search
CPC ......... G06F 1/1637; G06F 2203/04108; G06F 3/0421; G06F 3/0412; G06F 3/0416
See application file for complete search history.

(56) References Cited

U.S. PATENT DOCUMENTS

| | | | |
|---|---|---|---|
| 2015/0084994 A1* | 3/2015 | Wyrwas | G09G 3/02 345/32 |
| 2015/0346911 A1 | 12/2015 | Christiansson | |
| 2016/0334883 A1 | 11/2016 | Kim | |
| 2018/0156964 A1 | 6/2018 | Song et al. | |

FOREIGN PATENT DOCUMENTS

| | | |
|---|---|---|
| CN | 106155302 A | 11/2016 |
| CN | 206389421 U | 8/2017 |
| CN | 108169839 A | 6/2018 |
| CN | 108762487 A | 11/2018 |
| CN | 109656421 A | 4/2019 |
| EP | 0082691 A1 * | 6/1983 |

OTHER PUBLICATIONS

Office Action dated Sep. 30, 2020, issued in counterpart CN Application No. 201910163533.4, with English Translation. (24 pages).

* cited by examiner

DISPLAY APPARATUS

CROSS-REFERENCE TO RELATED APPLICATION

This application is a Section 371 Nation Stage Application of International Application No. PCT/CN2020/075735, filed on Feb. 18, 2020 and entitled with "Display Apparatus", and claims priority to Chinese Application No. 201910163533.4, filed on Mar. 5, 2019 the contents of which are incorporated herein by reference in their entirety.

TECHNICAL FIELD

Embodiments of the present disclosure relate to the field of display technology, and in particular, to a display apparatus.

BACKGROUND

A white frame is provided around a display area of an existing painted screen. To control the painted screen through optical gesture operations, multiple holes need to be provided in the area of the white frame to expose the optical device, but this method will destroy completeness of the white frame of the painted screen and affect the appearance of the painted screen.

SUMMARY

Embodiments of the present disclosure mainly provide the following technical solutions:

A display apparatus, comprising:
  a display panel;
  a frame, provided at a side part of the display panel and comprising a light-transmitting area;
  a plurality of light guide structures spaced apart from each other, one end of each light guide structure having a photosensitive area, the photosensitive area being provided opposite to the light-transmitting area so that light is irradiated on the photosensitive area through the light-transmitting area; and
  an optical device provided at an end of each light guide structure away from the photosensitive area,
  wherein each of the light guide structures is configured to transmit the light irradiated on the photosensitive area to the optical device.

According to some embodiments of the present disclosure, the frame comprises a first frame, and a plurality of the light guide structures are provided in the first frame, and distances between the photosensitive areas of the plurality of light guide structures and a side edge of the first frame are not exactly the same.

According to some embodiments of the present disclosure, the frame further comprises a second frame adjacent to the first frame, and a plurality of the light guide structures are provided in the second frame.

According to some embodiments of the present disclosure, the frame comprises adjacent first frame and second frame, a plurality of the light guide structures are provided in both the first frame and the second frame, and distances between the photosensitive areas of the plurality of light guide structures and a side edge of the corresponding frame where the photosensitive areas of the plurality of light guide structures are located are the same.

According to some embodiments of the present disclosure, the optical device comprises a transmitting component and a switching component; the display apparatus further comprises a switching control component connected to the switching component and configured to control a switching state of the switching component; the transmitting component is connected to the switching component, and the switching component is configured to control the transmitting component to emit light so as to transmit the light emitted by the transmitting component to external environment through the light guide structure; or,
  the optical device comprises a receiving component, a transmitting component, and a control circuit connected to the receiving component and the transmitting component, and the control circuit is configured to control the transmitting component to emit light in response to the receiving component not receiving an optical signal.

According to some embodiments of the present disclosure, the light guide structure is in a bar shape, the light guide structure has a first chamfered surface corresponding to the photosensitive area, and the first chamfered surface is configured to transmit the light irradiated on the photosensitive area to the optical device.

According to some embodiments of the present disclosure, the light guide structure is in a bent shape, the light guide structure has a first chamfered surface corresponding to the photosensitive area, a bend of the light guide structure is provided with a second chamfered surface, the first chamfered surface is configured to transmit the light irradiated on the photosensitive area to the second chamfered surface, and the second chamfered surface is configured to transmit the received light to the optical device.

According to some embodiments of the present disclosure, one end of the light guide structure is cut to form the first chamfered surface, and the bend of the light guide structure is cut to form the second chamfered surface; or,
  the light guide structure is formed by connecting a first sub-portion with a second sub-portion with a bent shape, the first sub-portion is connected to one end of the second sub-portion, a connection surface of the first sub-portion and the second sub-portion is the first chamfered surface, and the bend of the second sub-portion is cut to form the second chamfered surface; or,
  the light guide structure is formed of a first sub-portion, a second sub-portion with a bent shape, and a third sub-portion, the first sub-portion is connected to one end of the second sub-portion, the third sub-portion is connected to the bend of the second sub-portion, a connection surface of the first sub-portion and the second sub-portion is the first chamfered surface, and a connection surface of the second sub-portion and the third sub-portion is the second chamfered surface.

According to some embodiments of the present disclosure, the first chamfered surface is a refractive surface, and the first chamfered surface is configured to refract light irradiated on the photosensitive area; or
  the first chamfered surface is a reflective surface, and the first chamfered surface is configured to reflect light irradiated on the photosensitive area; and the reflective surface is coated with a reflective coating.

According to some embodiments of the present disclosure, the second chamfered surface is a refractive surface, and the second chamfered surface is configured to refract the received light; or
  the second chamfered surface is a reflective surface, and the second chamfered surface is configured to reflect the received light; and the reflective surface is coated with a reflective coating.

According to some embodiments of the present disclosure, the display apparatus further comprises an opaque reflective layer disposed between the display panel and the light guide structure.

According to some embodiments of the present disclosure, the display apparatus further comprises:
  a warning light configured to emit light so that the light emitted by the warning light is transmitted to external environment through the light guide structure;
  wherein the warning light is connected to a power switch of the display apparatus, and is configured in such a way that the warning light emits light in response to the power switch being energized; or, the display apparatus further comprises a voice control component, the voice control component is connected to the warning light, and is configured in such a way that the warning light emits light in response to the voice control component being triggered.

According to some embodiments of the present disclosure, the display apparatus further comprises a back cover and an outer casing, the outer casing is provided at a side part of the frame, the back cover is provided below the display panel, and the outer casing is fixedly connected to the back cover;
  the outer casing comprises a first cavity with an opening formed by a first side, a second side, and a third side, and the first side and the third side are respectively provided at both ends of the second side, the third side is fixedly connected to the back cover, and the optical device and an end of the light guide structure away from the photosensitive area are located in the first cavity.

According to some embodiments of the present disclosure, the first side, the second side, and the third side are straight plates, to form a U-shaped structure; or
  the first side and the second side are straight plates, and the third side is an L-shaped plate, and an end of the L-shaped plate away from the second side is connected to the back cover.

According to some embodiments of the present disclosure, the display apparatus further comprises a back cover and an outer casing, the outer casing is provided at a side part of the frame, the back cover is provided below the display panel, and the outer casing is fixedly connected to the back cover;
  the outer casing comprises an L-shaped structure formed by a fourth side and a fifth side, the fourth side is located above the side part of the frame, the fifth side is fixedly connected to the back cover, and the optical device and an end of the light guide structure away from the photosensitive area are located in a second cavity formed by the L-shaped structure and the back cover.

According to some embodiments of the present disclosure, the outer casing and the back cover are fixedly connected by a fixing member;
  the fixing member is a clamping block, and a connection portion between the back cover and the outer casing is provided with, a first clamping slot and a second clamping slot, and the clamping block is clamped in the first clamping slot and the second clamping slot; or, the fixing member is an L-shaped fastener, and the L-shaped fastener comprises two straight walls, wherein one of the straight walls of the L-shaped fastener is fixedly connected to the back cover, and the other of the straight walls of the L-shaped fastener is fixedly connected to the outer casing.

According to some embodiments of the present disclosure, the frame further comprises an opaque area, and the light-transmitting area is coated with a light-transmitting coating, so that the light-transmitting area and the opaque area have the same color.

According to some embodiments of the present disclosure, an opaque reflective layer is provided in the first frame or the second frame, and the opaque reflective layer is located between the display panel and the light guide structure.

The above description is only an overview of the technical solutions of the present disclosure. In order to understand the technical means of the present disclosure more clearly, so that it can be implemented in accordance with the content of the specification, and in order to make the above and other purposes, features and advantages of the present disclosure more obvious and easily understood, specific embodiments of the present disclosure are illustrated by the following specific examples.

DETAILED DESCRIPTION OF EMBODIMENTS

Figure 1:
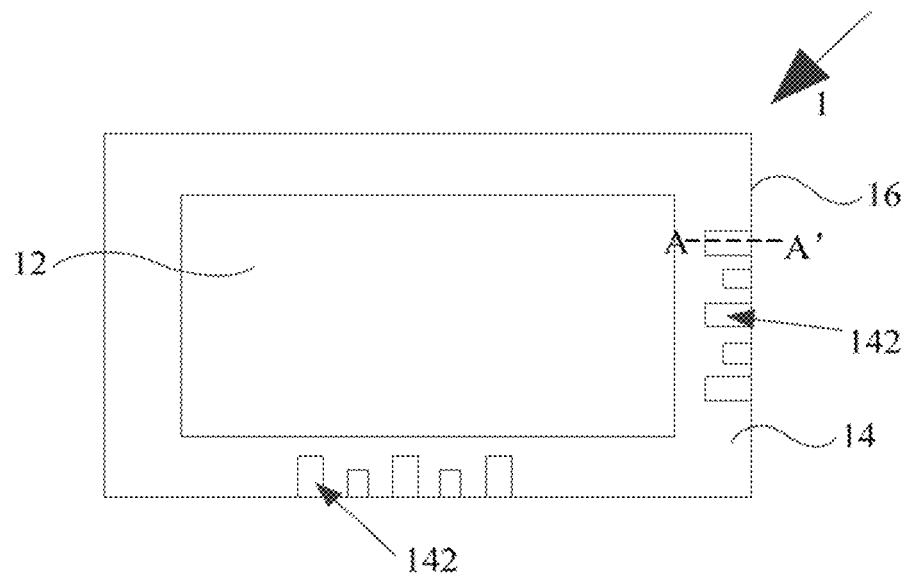
FIG. 1 is a top view of a display apparatus provided by an embodiment of the present disclosure.

In order to further illustrate the technical means adopted b the present disclosure to achieve the intended purpose and effects, the following describes the specific implementations, structures, features and functions of the display apparatus according to the present disclosure in conjunction with the drawings and preferred embodiments.

Embodiments of the present disclosure provide a display apparatus that realizes optical gesture control of the display apparatus without affecting the integrity of the frame.

As shown in FIGS. 1 to 4, an embodiment of the present disclosure provides a display apparatus 1, including:

a display panel 12 and a frame 14 provided at a side part of the display panel 12.

The frame 14 is provided at the side part of the display panel 14, so that the frame 14 can fix the display panel 12. The frame 14 includes a light-transmitting area. The light-transmitting area in the frame is made of a transparent material. The frame 14 is provided with a plurality of light guide structures 142. Each light guide structure 142 has a photosensitive area 1422 at one end. The photosensitive area 1422 is provided below the light-transmitting area, that is, the photosensitive area 1422 corresponds to the light-transmitting area. The other end of each light guide structure 142 is provided with an optical device 144, and each light guide structure 142 is used to transmit the light irradiated on the photosensitive area 1422 to the optical device 144. The optical device 144 is an optical sensor.

Figure 3:
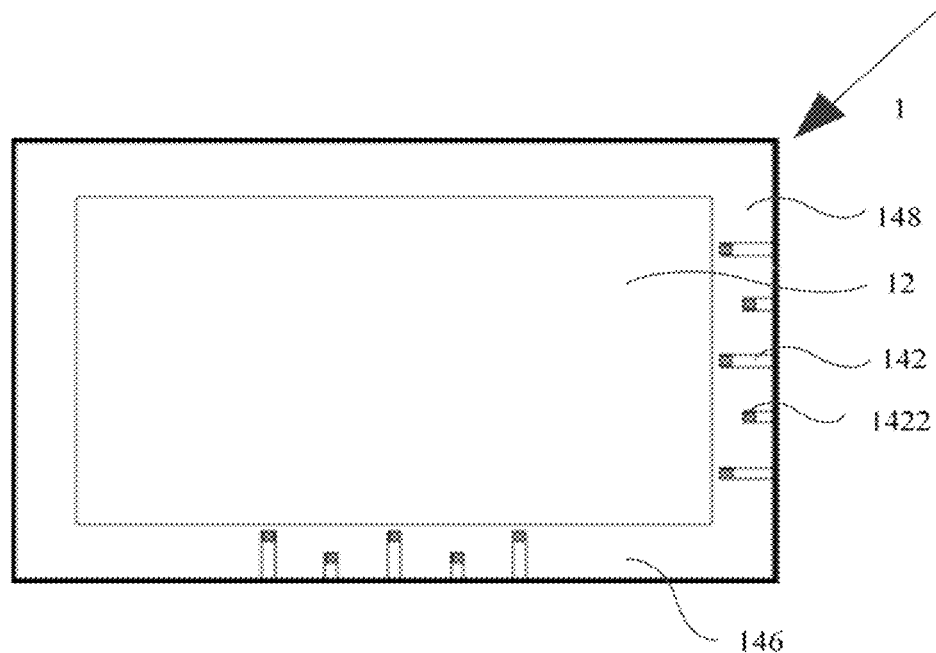
FIG. 3 is a top view of still another display apparatus provided by an embodiment of the present disclosure.
Figure 10:
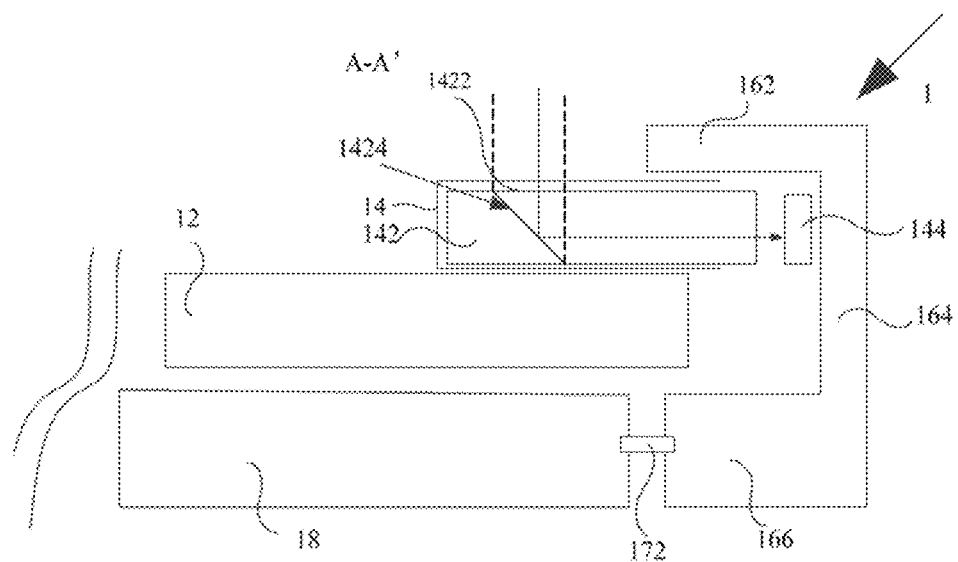
FIG. 10 is a cross-sectional view of a display apparatus provided by an embodiment of the present disclosure along a cross-section A-A' shown in FIG. 1.
Figure 11:
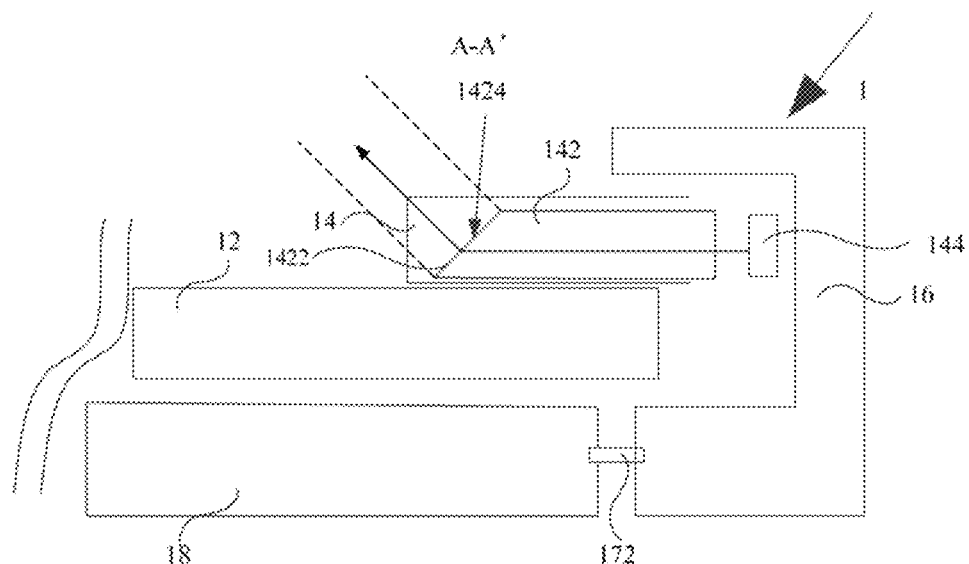
FIG. 11 is a cross-sectional view of another display apparatus provided by an embodiment of the present disclosure along a cross-section A-A' shown in FIG. 1.

As shown in FIGS. 10 and 11, the frame 14 is provided at the side part of the display panel 12, the frame 14 includes the light-transmitting area made of transparent materials, and the frame 14 is provided therein with a plurality of light guide structures 142, a material of the light guide structure 142 is of a transparent material such as optical glass or PMMA (polymethyl methacrylate). The photosensitive area 1422 at one end of each light guide structure 142 is provided below the light-transmitting area and corresponds to the light-transmitting area. A certain area of the upper part of the light guide structure as shown in FIG. 3 is the photosensitive area, so that the light can be irradiated on the photosensitive area 1422 of the light guide structure 142 through the light-transmitting area, and then the light irradiated on the photosensitive area 1422 is transmitted to the optical device 144 provided at the other end of the light guide structure 142 through the light guide structure 142, achieving the receiving of the optical signal by the optical device 144. The plurality of light guide structures 142 are arranged at intervals. When a gesture operation is performed on the photosensitive areas 1422 of the light guide structures 142, multiple optical devices 144 respectively receive corresponding optical signals, so that the display panel 12 performs corresponding displaying.

Figure 4:
FIG. 4 is a schematic view showing an upward optical gesture operation provided by an embodiment of the present disclosure.

As shown in FIG. 4, it is a schematic view showing an optical gesture operation performed from a user's gesture. When the user performs a gesture operation, the photosensitive areas 1422 of the plurality of light guide structures 142 will be blocked in sequence, and the light sensed by the photosensitive area 1422 blocked by the gesture will change, thereby, the plurality of light guide structures 142 will sequentially transmit the changed light to the corresponding optical devices 144, the plurality of optical devices 144 receive the changed optical signals sequentially, and then the plurality of optical devices 144 will convert the changed optical signals into changed electrical signals and transmit them to the printed circuit board 20. The printed circuit hoard 20 controls the display panel 12 to display in correspondence to the gesture operations according to the sequentially received changed electrical signals, so that displaying of the display panel 12 can be controlled by optical gesture operation.

The display apparatus 1 proposed by an embodiment of the present disclosure includes a display panel 12 and a frame 14. The frame 14 includes a light-transmitting area. The light-transmitting area is of a transparent material, so that light can be irradiated on the photosensitive area 1422 through the light-transmitting area, and then the light guide structure 142 transmits the light irradiated on the photosensitive area 1422 to the optical device 144. When a gesture operation is performed on the photosensitive areas 1422 of the light guide structures 142, the plurality of optical devices 144 respectively receive corresponding optical signals to enable the display panel 12 to display accordingly. Compared with the related art, in the present application, the frame 14 does not need to be opened with holes, and can realize the control of the displaying of the display panel 12 through optical gesture operations, maintaining integrity of the frame 14 of the display apparatus 1, and making the display apparatus 1 more beautiful.

The present disclosure will be further described in detail below in conjunction with the drawings and embodiments.

As shown in FIG. 1 to FIG. 8, in the embodiment of the present disclosure, the frame 14 includes a first frame 146, and a plurality of light guide structures 142 are provided in the first frame 146, and distances between the photosensitive areas 1422 of the plurality of light guide structures 142 and a side edge the first frame 146 are not exactly the same.

In this embodiment, the plurality of light guide structures 142 are provided in the first frame 146, and the light guide structure 142 will transmit the light irradiated on the photosensitive area 1422 to the optical device 144 in real time. Distances between the photosensitive areas 1422 of the plurality of light guide structures 142 and the side edge of the first frame 146 are not exactly the same, so the plurality of light guide structures 142 provided in the first frame 146 can realize different displaying of the display panel 12 according to the direction of the gesture operation. The gesture operation includes an upward gesture operation and a downward gesture operation, a leftward gesture operation, a rightward gesture operation, etc. The leftward and the rightward gesture operations can be used to turn pages on the display panel, the upward and downward gesture operations can be used to return to and enter into the page displayed on display panel, and so on. Of course, the upward gesture operation and the downward gesture operation, the leftward gesture operation and the rightward gesture operation are not limited to these two functions. When performing a gesture operation, the gesture will sequentially block the photosensitive areas 1422 of the plurality of light guide structures 142, and when the gesture blocks the photosensitive area 1422, the brightness of the light irradiated on the photosensitive area 1422 will decrease, the optical signal transmitted from the light guide structure 142 to the optical device 144 will also become weaker, and as the gesture moves, the plurality of optical devices 144 will sequentially receive the weakened optical signals sent by the corresponding light guide structures 142, and then the weakened optical signal is converted to a weakened electrical signal and is transmitted to the printed circuit board 20, the plurality of optical devices 144 are integrated on one printed circuit board 20, and the control chip on the printed circuit board 20 controls the display panel 12 to display accordingly according to the order of the weakened electrical signals received sequentially.

According to some embodiments of the present disclosure, the arrangement direction of the plurality of light guide structures 142 is parallel or perpendicular to the length direction of the frame where the plurality of light guide structures 142 are located.

As shown in FIGS. 4 to 8, the reference numerals 1, 2, 3, 4 and 5 in the figures are respectively a first light guide structure, a second light guide structure, a third light guide structure, a fourth light guide structure and a fifth light guide structure, when the number becomes darker, the photosensitive area representing the light guide structure is blocked. In some embodiments of the present disclosure, the first frame 146 includes a first light guide structure, a second light guide structure, a third light guide structure, a fourth light guide structure and a fifth fight guide structure that are sequentially arranged along the length direction of the first frame. Distances between the photosensitive areas 1422 of the first light guide structure, the third light guide structure, and the fifth light guide structure and the side edge of the first frame 146 are the same. Distances between the photosensitive areas 1422 of the second light guide structure and the fourth light guide structure and the side edge of the first frame 146 are the same. Distances between the photosensitive areas 1422 of the first light guide structure, the third light guide structure, and the fifth light guide structure and the side edge of the first frame 146 are greater than distances between the photosensitive areas 1422 of the second light guide structure and the fourth light guide structure and the side edge of the first frame 146.

Figure 5:
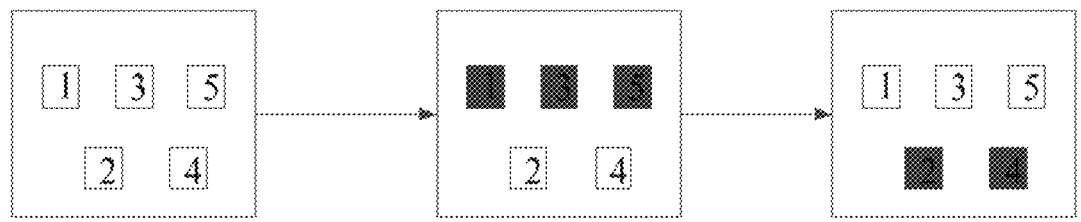
FIG. 5 is a schematic diagram showing a downward optical gesture operation provided by an embodiment of the present disclosure.

As shown in FIG. 5, before performing the downward gesture operation, the light irradiated on the photosensitive areas 1422 of the five light guide structures 142 has no change compared with the case that no gesture is performed. When performing the downward gesture operation, the user's gesture is moving downwards from above, firstly the photosensitive areas 1422 of the first light guide structure, third light guide structure and fifth light guide structure will be blocked, the brightness of the light sensed by the photosensitive areas 1422 of the first light guide structure, third light guide structure and fifth light guide structure will decrease, while the brightness of the light sensed by the photosensitive areas 1422 of the remaining light guide structures 142 is the same as that before performing the gesture operation. The first light guide structure, the third light guide structure and the fifth light guide structure transmit the light with reduced brightness to the corresponding optical devices 144, and the optical devices 144 convert the weakened light signals into weakened electrical signals and transmits them to the printed circuit board 20. When the gesture continues to move downwards, the photosensitive areas 1422 of the second light guide structure and the fourth light guide structure are blocked, the brightness of the light sensed by the photosensitive areas 1422 of the second light guide structure and the fourth light guide structure will decrease, while the brightness of the light sensed by the photosensitive areas 1422 of the remaining light guide structures 142 is the same as that before performing the gesture operation. The second light guide structure and the fourth light guide structure will transmit the light with reduced brightness to the corresponding optical devices 144, and the optical devices 144 convert the weakened light signals into weakened electrical signals and transmits them to the printed circuit board 20. The control chip on the printed circuit board 20 controls the display panel 12 to perform corresponding displaying according to the order of the weakened electrical signals received in sequence.

Figure 6:
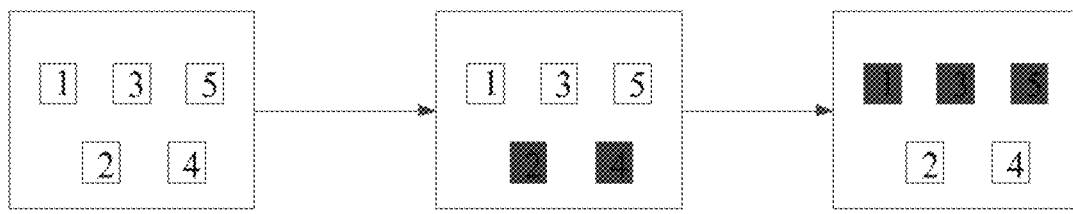
FIG. 6 is a schematic diagram showing an upward optical gesture operation provided by an embodiment of the present disclosure.

As shown in FIG. 6, before performing the upward gesture operation, the light irradiated on the photosensitive areas 1422 of the live light guide structures 142 has no change compared with the the case that no gesture is performed. When performing the upward gesture operation, the user's gesture is moving upwards from bottom, firstly the photosensitive areas 1422 of the second light guide structure and fourth light guide structure will be blocked, the brightness of the light sensed by the photosensitive areas 1422 of the second light guide structure and fourth light guide structure will decrease, while the brightness of the light sensed by the photosensitive areas 1422 of the remaining light guide structures 142 is the same as that before performing the gesture operation. The second light guide structure and fourth light guide structure transmit the light with reduced brightness to the corresponding optical devices 144, and the optical devices 144 convert the weakened light signals into weakened electrical signals and transmits them to the printed circuit board 20. When the gesture continues to move upwards, the photosensitive areas 1422 of the first light guide structure, the third light guide structure and the fifth light guide structure are blocked, the brightness of the light sensed by the photosensitive areas 1422 of the first light guide structure, the third light guide structure and the fifth light guide structure will decrease, while the brightness of the light sensed by the photosensitive areas 1422 of the remaining light guide structures 142 is the same as that before performing the gesture operation. The first light guide structure, the third light guide structure and the fifth light guide structure will transmit the light with reduced brightness to the corresponding optical devices 144, and the optical devices 144 convert the weakened light signals into weakened electrical signals and transmits them to the printed circuit board 20. The control chip on the printed circuit board 20 controls the display panel 12 to perform corresponding displaying according to the order of the weakened electrical signals received in sequence.

Figure 7:
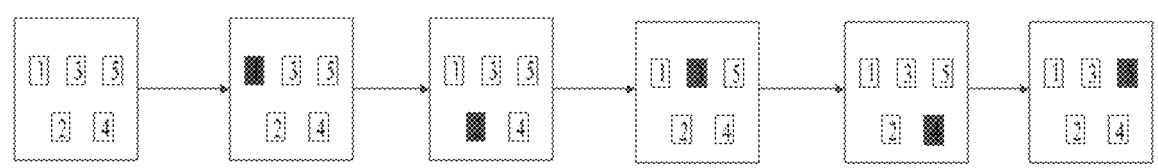
FIG. 7 is a schematic diagram showing a rightward optical gesture operation provided by an embodiment of the present disclosure.

As shown in FIG. 7, before performing the rightward gesture operation, the light irradiated on the photosensitive areas 1422 of the five light guide structures 142 does not change compared with the case that no gesture is performed. When performing the rightward gesture operation, the user's gesture moves from the first light guide structure towards the fifth light guide structure, the photosensitive area 1422 of the first light guide structure is blocked first, the brightness of the light sensed by the photosensitive area 1422 of the first light guide structure will decrease, while the brightness of the light sensed by the photosensitive areas 1422 of the remaining light guide structures 142 is the same as that before performing the gesture operation. The first light guide structure will transmit the light with reduced brightness to the corresponding optical device 144, and the optical device 144 converts the weakened light signal to a weakened electrical signal and transmits it to the printed circuit board 20. When the gesture continues to move to the right, the photosensitive area 1422 of the second light guide structure is blocked, the brightness of the light sensed by the photosensitive area 1422 of the second light guide structure will decrease, while the brightness of the light sensed by the photosensitive areas 1422 of the remaining light guide structures 142 is the same as that before performing the gesture operation. The second light guide structure will transmit the light with reduced brightness to the corresponding optical device 144, and the optical device 144 converts the weakened light signal to a weakened electrical signal and transmits it to the printed circuit board 20. When the gesture continues to move to the right, the photosensitive area 1422 of the third light guide structure is blocked, the brightness of the light sensed by the photosensitive area 1422 of the third light guide structure will decrease, while the brightness of the light sensed by the photosensitive areas 1422 of the remaining light guide structures 142 is the same as that before performing the gesture operation. The third light guide structure will transmit the light with reduced brightness to the corresponding optical device 144, and the optical device 144 converts the weakened light signal to a weakened electrical signal and transmits it to the printed circuit board 20. When the gesture continues to move to the right, the photosensitive area 1422 of the fourth light guide structure is blocked, the brightness of the light sensed by the photosensitive area 1422 of the fourth light guide structure will decrease, while the brightness of the light sensed by the photosensitive areas 1422 of the remaining light guide structures 142 is the same as that before performing the gesture operation. The fourth light guide structure will transmit the light with reduced brightness to the corresponding optical device 144, and the optical device 144 converts the weakened light signal to a weakened electrical signal and transmits it to the printed circuit board 20. When the gesture continues to move to the right, the photosensitive area 1422 of the fifth light guide structure is blocked, the brightness of the light sensed by the photosensitive area 1422 of the fifth light guide structure will decrease, while the brightness of the light sensed by the photosensitive areas 1422 of the remaining light guide structures 142 is the same as that before performing the gesture operation. The fifth light guide structure will transmit the light with reduced brightness to the corresponding optical device 144, and the optical device 144 converts the weakened light signal to a weakened electrical signal and transmits it to the printed circuit board 20. The control chip on the printed circuit board 20 controls the display panel 12 to perform corresponding displaying according to the order of the weakened electrical signals received in sequence.

Figure 8:
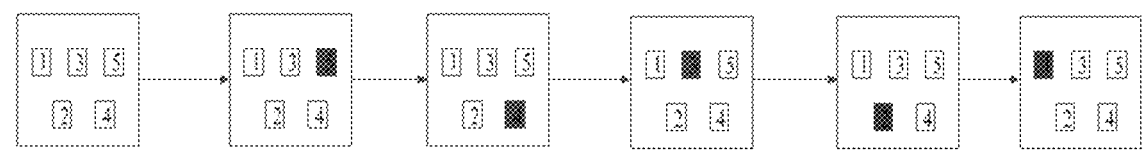
FIG. 8 is a schematic diagram showing a leftward optical gesture operation provided by an embodiment of the present disclosure.

As shown in FIG. 8, before performing the leftward gesture operation, the light irradiated on the photosensitive areas 1422 of the five light guide structures 142 does not change compared with the case that no gesture is performed. When performing the leftward gesture operation, the user's gesture moves from the fifth light guide structure towards the first light guide structure, the photosensitive area 1422 of the fifth light guide structure is blocked first, the brightness of the light sensed by the photosensitive area 1422 of the fifth light guide structure will decrease, while the brightness of the light sensed by the photosensitive areas 1422 of the remaining light guide structures 142 is the same as that before performing the gesture operation. The fifth light guide structure will transmit the light with reduced brightness to the corresponding optical device 144, and the optical device 144 converts the weakened light signal to a weakened electrical signal and transmits it to the printed circuit board 20. When the gesture continues to move to the left, the photosensitive area 1422 of the fourth light guide structure is blocked, the brightness of the light sensed by the photosensitive area 1422 of the fourth light guide structure decrease, while the brightness of the light sensed by the photosensitive areas 1422 of the remaining light guide structures 142 is the same as that before performing the gesture operation. The fourth light guide structure will transmit the light with reduced brightness to the corresponding optical device 144, and the optical device 144 converts the weakened light signal to a weakened electrical signal and transmits it to the printed circuit hoard 20. When the gesture continues to move to the left, the photosensitive area 1422 of the third light guide structure is blocked, the brightness of the light sensed by the photosensitive area 1422 of the third light guide structure will decrease, while the brightness of the light sensed by the photosensitive areas 1422 of the remaining light guide structures 142 is the same as that before performing the gesture operation. The third light guide structure will transmit the light with reduced brightness to the corresponding optical device 144, and the optical device 144 converts the weakened light signal to a weakened electrical signal and transmits it to the printed circuit board 20. When the gesture continues to move to the left, the photosensitive area 1422 of the second light guide structure is blocked, the brightness of the light sensed by the photosensitive area 1422 of the second light guide structure will decrease, while the brightness of the light sensed by the photosensitive areas 1422 of the remaining light guide structures 142 is the same as that before performing the gesture operation. The second light guide structure will transmit the light with reduced brightness to the corresponding optical device 144, and the optical device 144 converts the weakened light signal to a weakened electrical signal and transmits it to the printed circuit hoard 20. When the gesture continues to move to the left, the photosensitive area 1422 of the first light guide structure is blocked, the brightness of the light sensed by the photosensitive area 1422 of the first light guide structure will decrease, while the brightness of the light sensed by the photosensitive areas 1422 of the remaining light guide structures 142 is the same as that before performing the gesture operation. The first light guide structure will transmit the light with reduced brightness to the corresponding optical device 144, and the optical device 144 converts the weakened light signal to a weakened electrical signal and transmits it to the printed circuit board 20. The control chip on the printed circuit board 20 controls the display panel 12 to perform corresponding displaying according to the order of the weakened electrical signals received in sequence.

As shown in FIGS. 1 and 3, in the embodiments of the present disclosure, the frame further comprises a second frame adjacent to the first frame, and a plurality of the light guide structures are provided in the second frame.

In the embodiments, the frame 14 comprises adjacent first frame 146 and second frame 148, a plurality of the light guide structures 142 are provided in both the first frame 146 and the second frame 148, and distances between the photosensitive areas 1422 of the plurality of light guide structures 142 and a side edge of the corresponding frame where the photosensitive areas 1422 of the plurality of light guide structures 142 are located are not exactly the same, so that optical gestures can be performed on both the first frame 146 and the second frame 148.

In the embodiments of the present disclosure, the frame 14 comprises adjacent first frame 146 and second frame 148, a plurality of the light guide structures 142 are provided in both the first frame 146 and the second frame 148, and distances between the photosensitive areas 1422 of the plurality of light guide structures 142 and a side edge of the corresponding frame where the photosensitive areas 1422 of the plurality of light guide structures 142 are located are the same.

Figure 2:
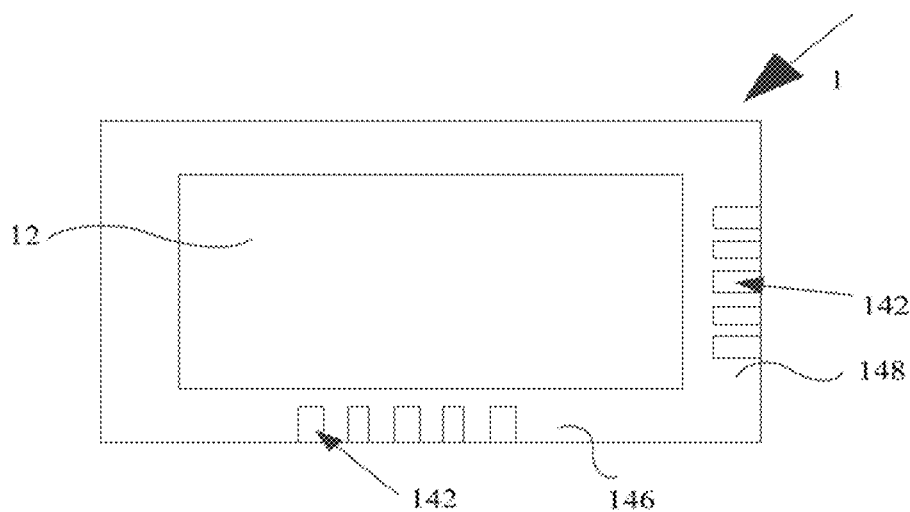
FIG. 2 is a top view of another display apparatus provided by an embodiment of the present disclosure.

As shown in FIG. 2, in this embodiment, the frame 14 comprises adjacent first frame 146 and second frame 148, a plurality of the light guide structures 142 are provided in both the first frame 146 and the second frame 148. Distances between the photosensitive areas 1422 of the plurality of light guide structures 142 and a side edge of the first frame 146 are located are the same, so that the gesture operation parallel to the direction of the first frame 146 can be realized to complete the gesture operation in the left and right direction. Distances between the photosensitive areas 1422 of the plurality of light guide structures 142 and a side edge of the second frame 148 are located are the same, so that the gesture operation parallel to the direction of the second frame 148 can be realized to complete the gesture operation in the upward and downward direction. By providing the plurality of light guide structures 142 on the two adjacent frames 14 with the same distance from the plurality of photosensitive areas 1422 to the corresponding frame 14 where the plurality of light guide structures 142 are located, the user can complete the gesture operations in the four upward, downward, leftward, and rightward directions, so as to control the corresponding displaying of the display apparatus.

Figure 9A:
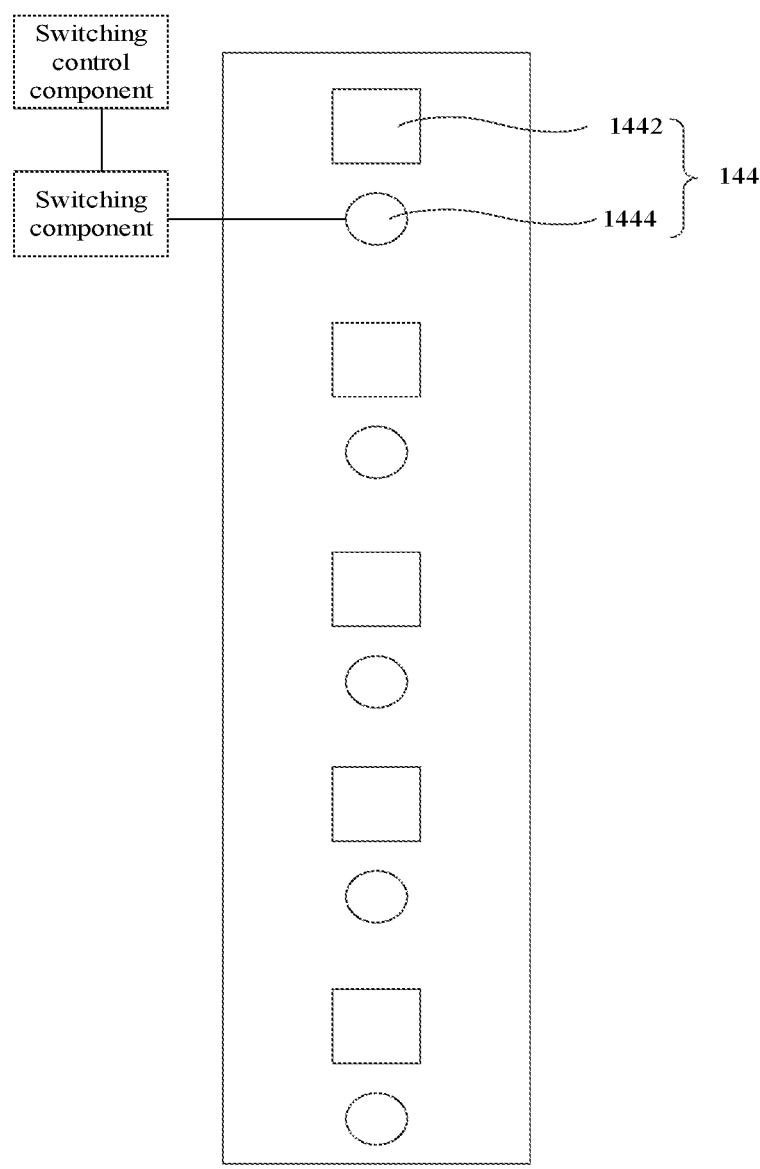
FIGS. 9A and 9B are schematic structural diagrams of a printed circuit board provided by an embodiment of the present disclosure.
Figure 9B:
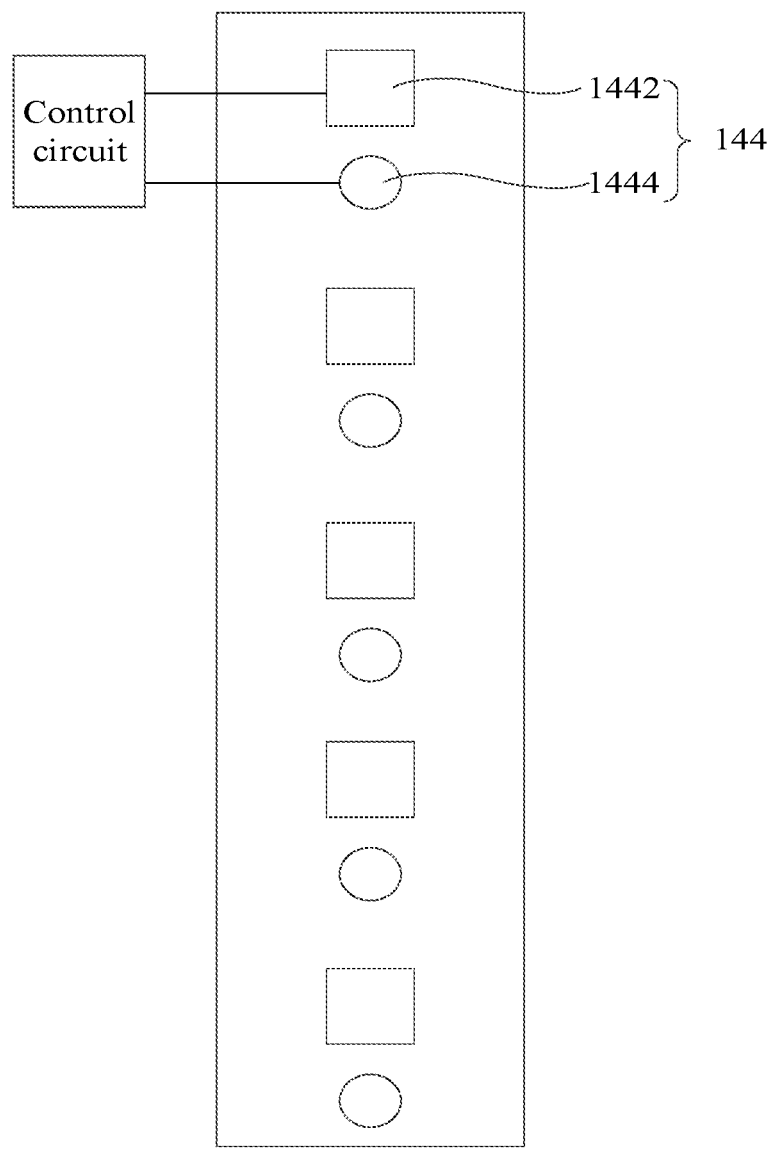

As shown in FIGS. 9A and 9B, in the embodiments of the present disclosure, the optical device comprises a transmitting component and a switching component; the display apparatus further comprises a switching control component connected to the switching component and configured to control a switching state of the switching component; the transmitting component is connected to the switching component, and the switching component is configured to control the transmitting component to emit light so as to transmit the light emitted by the transmitting component to external environment through the light guide structure; or, the optical device 144 comprises a receiving component 1442, a transmitting component 1444, and a control circuit connected to the receiving component and the transmitting component, and the control circuit is configured to control the transmitting component 1444 to emit light when the receiving component does not receive an optical signal.

In this embodiment, the display apparatus 1 includes a switching control component, the switching control component is connected to the switching component to control the switching state of the switching component, and the switching component is connected to the transmitting component. When the switching component is connected, the transmitting component is controlled to emit light. After the display apparatus 1 is turned on, the switching control component is turned on, so that the switching component is energized to turn on the transmitting component 1444. When the display apparatus 1 is in a dark environment, the light emitted by the transmitting component 1444 can enhance the brightness of the environment and perform optical detection. The light emitted by the transmitting component 1444 is infrared light, the switching control component can be a touch switch, a physical switch, or a remote control, etc. The switching component can be a control circuit with a switching device (such as a relay, etc.).

According to some embodiments of the present disclosure, the optical device 144 includes a receiving component 1442, a transmitting component 1444, and a control circuit. When the display apparatus is started and the receiving component 1442 does not receive an optical signal, that is, the external environment is in a dark state or the photosensitive area is blocked, the transmitting component 1444 is controlled to emit light. On the one hand, when the display apparatus 1 is in a dark environment, the transmitting component 1444 emits light, which can enhance the brightness of the environment; on the other hand, when the photosensitive area is blocked, the transmitting component 1444 emits light, as a result, the user can judge that the gesture operation has succeeded by the light emitted by the transmitting component 1444.

According to some embodiments of the present disclosure, the optical device 144 further includes a receiving component, the receiving component is configured to receive an optical signal, and the optical device is an optical sensor.

As shown in FIGS. 10 and 11, in the embodiments of the present disclosure, the light guide structure 142 is in a bar shape, and the light guide structure 142 has a first chamfered surface 1424 corresponding to the photosensitive area 1422, and the first chamfered surface 1424 is configured to transmit light irradiated on the photosensitive area 1422 to the optical device 144.

In this embodiment, shape and light guide manner of a light guide structure 142 are provided. The light guide structure 142 has a first chamfered surface 1424 corresponding to the photosensitive area 1422. As shown in FIG. 10, the photosensitive area is an area corresponding to the first chamfered surface, and the area where the dotted lines define is the area of the photosensitive area 1422 of the light guide structure 142; as shown in FIG. 11, the photosensitive area is an area corresponding to the first chamfered surface, and the area where the dotted lines define is the area of the photosensitive area 1422 of the light guide structure 142. Light is irradiated on the photosensitive area 1422, and then is transmitted through the first chamfered surface 1424 corresponding to the photosensitive area 1422. The light guide structure 142 is in a bar shape, therefore, the light can be transmitted to the optical device 144 at the other end of the light guide structure 142 only through the first chamfered surface 1424, achieving transmission of the light. The direction of the arrow in the figure is the direction of light transmission. As shown in FIG. 10, the light irradiated on the photosensitive area is transmitted by the reflection of the first chamfered surface 1424 to the optical device. As shown in FIG. 11, the light emitted by the transmitting component is transmitted by the refraction of the first chamfered surface to the outside.

The cross-sectional views of FIGS. 10, 11, and 17-19 are cross-sectional views at the position of the cross-section A-A' of the display apparatus shown in FIG. 1, but the display apparatus shown in FIGS. 10, 11, 17-19 may be different from the display apparatus of FIG. 1. Here, the display apparatus of FIG. 1 is used to only show the position of the cross-section A-A' desired to be taken.

Figure 12:
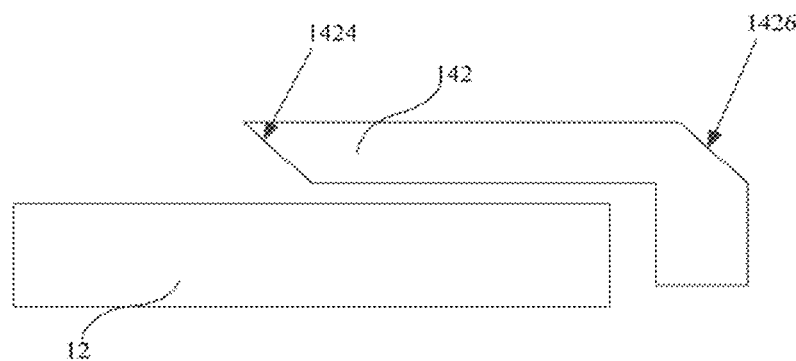
FIG. 12 is a schematic structural diagram of a light guide structure provided by an embodiment of the present disclosure.
Figure 13:
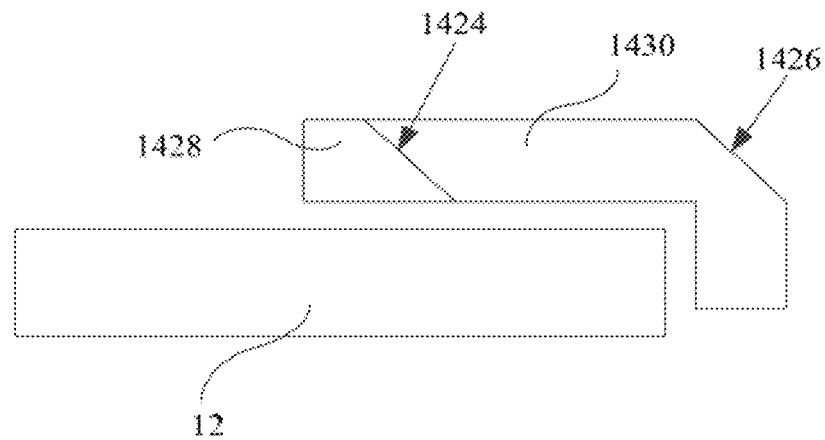
FIG. 13 is a schematic structural diagram of another light guide structure provided by an embodiment of the present disclosure.
Figure 14:
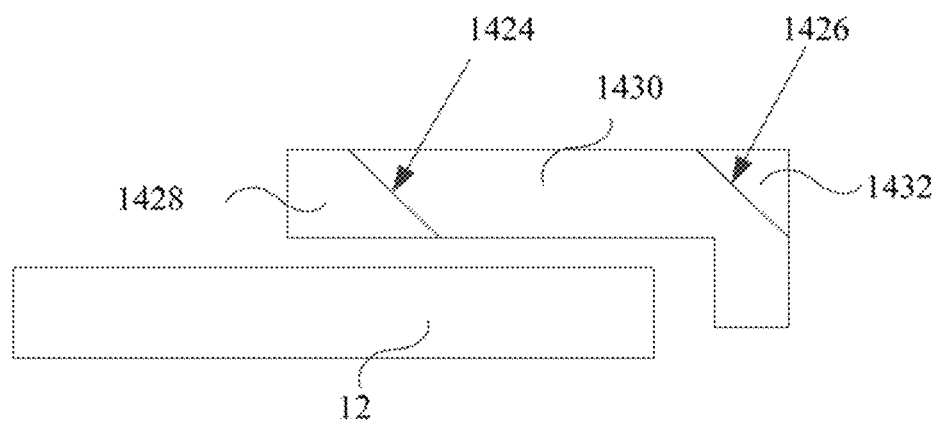
FIG. 14 is a schematic structural diagram of yet another light guide structure provided by an embodiment of the present disclosure.

As shown in FIGS. 12 to 14, in the embodiments of the present disclosure, shape and light guide manner of another light guide structure 142 are provided. The light guide structure 142 is in a bent shape, and the light guide structure 142 has a first chamfered surface 1424 corresponding to the photosensitive area 1422. A bend of the light guide structure 142 is provided with a second chamfered surface 1426, and the first chamfered surface 1424 is configured to transmit the light irradiated on the photosensitive area 1422 to the second chamfered surface 1426, the second chamfered surface 1426 is configured to transmit the received light to the optical device 144. It should be noted that the bent shape in the embodiments of the present disclosure means that the light guide structure includes at least two main extension directions, and the two main extension directions are not parallel. Further, the bent shape refers to a shape with a corner.

In the embodiments of the present disclosure, when the light guide structure 142 is in a bent shape, the light guide structure 142 includes the following structures:

one end of the light guide structure 142 is cut to form the first chamfered surface 1424, and the bend of the light guide structure 142 is cut to form the second chamfered surface 1426; or, the light guide structure 142 is formed by connecting a first sub-portion 1428 with a second sub-portion 1430 with a bent shape, the first sub-portion 1428 is connected to one end of the second sub-portion 1430, a connection surface of the first sub-portion 1428 and the second sub-portion 1430 is the first chamfered surface 1424, and the bend of the second sub-portion 1430 is cut to form the second chamfered surface 1426, so that the end of the light guide structure 142 provided with the first sub-portion 1428 is not a sharp chamfered surface; or, the light guide structure 142 is formed of a second sub-portion 1430 with a bent shape, a first sub-portion 1428 connected to one end of the second sub-portion 1430, and a third sub-portion 1432 connected to the bend of the second sub-portion 1430, the connection surface of the first sub-portion 1428 and the second sub-portion 1430 is the first chamfered surface 1424, and a connection surface of the second sub-portion 1430 and the third sub-portion 1432 is the second chamfered surface 1426, so that the end of the light guide structure 142 provided with the first sub-portion 1428 and the end of the light guide structure 142 provided with the third sub-portion 1432 are not sharp chamfered surfaces.

In the embodiments of the present disclosure, the first chamfered surface 1424 is a refractive surface, and the first chamfered surface 1424 is configured to refract the light irradiated on the photosensitive area 1422; or the first chamfered surface 1424 is a reflective surface, and the first chamfered surface 1424 is configured to reflect the light irradiated on the photosensitive area 1422; and the reflective surface is coated with a reflective coating.

In the embodiments of the present disclosure, the second chamfered surface 1426 is a refractive surface, and the second chamfered surface 1426 is configured to refract the received light; or the second chamfered surface 1426 is a reflective surface, and the second chamfered surface 1426 is configured to reflect the received light; and the reflective surface is coated with a reflective coating, so as to improve the reflectivity of the reflective surface. The reflective coating can be $LaF_3$ (lanthanum trifluoride), $MgF_2$ (magnesium fluoride) or other materials. The reflective coating can be a transparent reflective coating or an opaque reflective coating.

As shown in FIG. 12, in this embodiment, one end of the light guide structure 142 is cut to form the first chamfered surface 1424, and the bend of the light guide structure 142 is cut to form the second chamfered surface 1426, where both the first chamfered surface 1424 and the second chamfered surface 1426 are reflective surfaces, and the reflective surfaces are coated with a reflective coating, so as to improve the reflectivity of the reflective surfaces. The light irradiated on the photosensitive area 1422 is transmitted to the optical device 144 through the first chamfered surface 1424 with the reflective coating and the second chamfered surface 1426 with the reflective coating.

In this embodiment, one end of the light guide structure 142 is cut to form the first chamfered surface 1424, and the bend of the light guide structure 142 is cut to form the second chamfered surface 1426, where the first chamfered surface 1424 is a refractive surface and the second chamfered surface 1426 is a reflective surface, the reflective surface is coated with a reflective coating. The light irradiated on the photosensitive area 1422 is refracted by the first chamfered surface 1424 and reflected by the second chamfered surface 1426 with the reflective coating, and is then transmitted to the optical device 144, at this time the arrangement of the first chamfered surface 1424 is similar to the arrangement of the first chamfered surface 1424 in FIG. 11.

As shown in FIG. 13, in this embodiment, the light guide structure 142 is formed of a first sub-portion 1428 and a second sub-portion 1430 with a bent shape, and one end of the first sub-portion 1428 is cut to form a first chamfered surface 1424, the first chamfered surface 1424 is a reflective surface, and a reflective coating is coated on the first chamfered surface 1424, one end of the second sub-portion 1430 is cut to form a first chamfered surface 1424, and a reflective coating is coated on the first chamfered surface 1424, and the first chamfered surface 1424 of the first sub-portion 1428 and the first chamfered surface 1424 of the second sub-portion 1430 are adhered together. The first chamfered surface 1424 of the first sub-portion 1428 and the first chamfered surface 1424 of the second sub-portion 1430 have the same reflectivity. Provision of the first chamfered surface 1424 with two-layers of reflective coating allows the reflective surface to be provided inside the light guide structure 142. The light is reflected by the first chamfered surfaces of the first sub-portion 1428 and the second sub-portion 1430 coated with two layers of the reflective coating, thereby increasing the reflectivity of the first chamfered surface 1424. The other end of the second sub-portion 1430 is cut to form a second chamfered surface 1426, the second chamfered surface 1426 is a reflective surface, and a reflective coating is coated on the second chamfered surface 1426, thereby increasing the reflectivity of the second chamfered surface 1426, and the light irradiated on the photosensitive area 1422 is transmitted to the optical device 144 through the first chamfered surface 1424 with reflective coating and the second chamfered surface 1426 with reflective coating.

Figure 18:
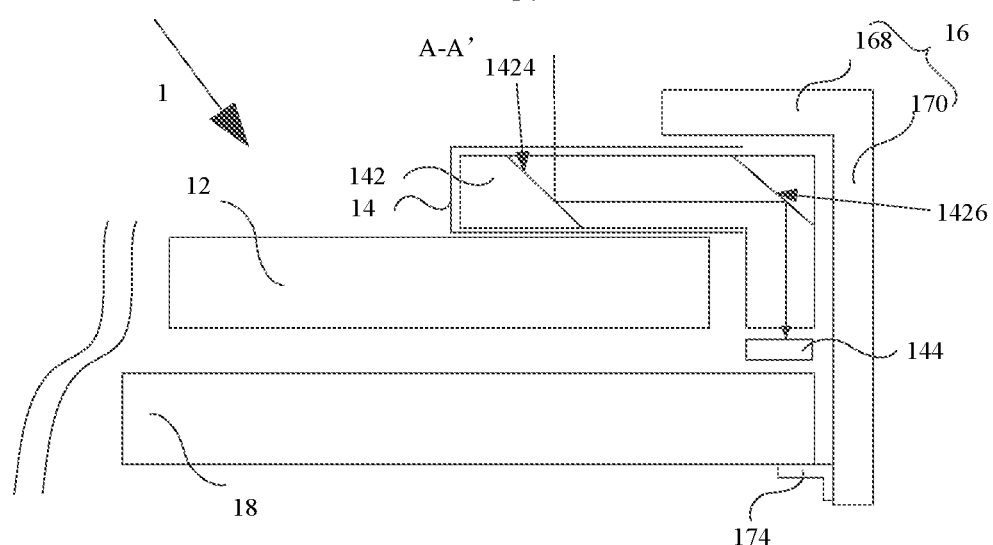
FIG. 18 is a cross-sectional view of yet still another display apparatus provided by an embodiment of the present disclosure along a cross-section A-A' shown in FIG. 1.

As shown in FIGS. 14 and 18, in this embodiment, the light guide structure 142 includes a second sub-portion 1430 with a bent shape, and a first sub-portion 1428 and a third sub-portion 1432 connected to the ends of the second sub-portion 1430, respectively. One end of the first sub-portion 1428 is cut to form a first chamfered surface 1424, the first chamfered surface 1424 is a reflective surface, and a reflective coating is coated on the first chamfered surface 1424. One end of the second sub-portion 1430 is cut to form a chamfered surface 1424, and a reflective coating is coated on the first chamfered surface 142. The first chamfered surface 1424 of the first sub-portion 1428 and the second chamfered surface 1424 of the first sub-portion 1430 are adhered together. The first chamfered surface 1424 of the first sub-portion 1428 and the first chamfered surface 1424 of the second sub-portion 1430 have the same reflectivity. Provision of the first chamfered surface 1424 with two-layers of reflective coating increases the reflectivity of the first chamfered surface 1424. The other end of the second sub-portion 1430 is cut to form a second chamfered surface 1426, the second chamfered surface 1426 is a reflective surface, and a reflective coating is coated on the second chamfered surface 1426. The cut-out portion of the third sub-portion 1432 is the same as that of the second sub-portion 1430, that is, the third sub-portion 1432 also has a second chamfered surface 1426, the second chamfered surface 1426 is coated with a reflective coating, and the second chamfered surface 1426 of the second sub-portion 1430 and the second chamfered surface 1426 of the third sub-portion 1432 have the same reflectivity. The second chamfered surface 1426 of the second sub-portion 1430 and the second chamfered surface 1426 of the third sub-portion 1432 are adhered together. Provision of the second chamfered surface 1426 with two-layers of reflective coating increases the reflectivity of the second chamfered surface 1426. As shown in FIG. 18, the direction of the arrow is the direction of light transmission, and the light irradiated on the photosensitive region 1422 is transmitted to the optical device 144 through the first chamfered surface 1424 with a reflective coating and the second chamfered surface 1426 with a reflective coating.

Figure 19:
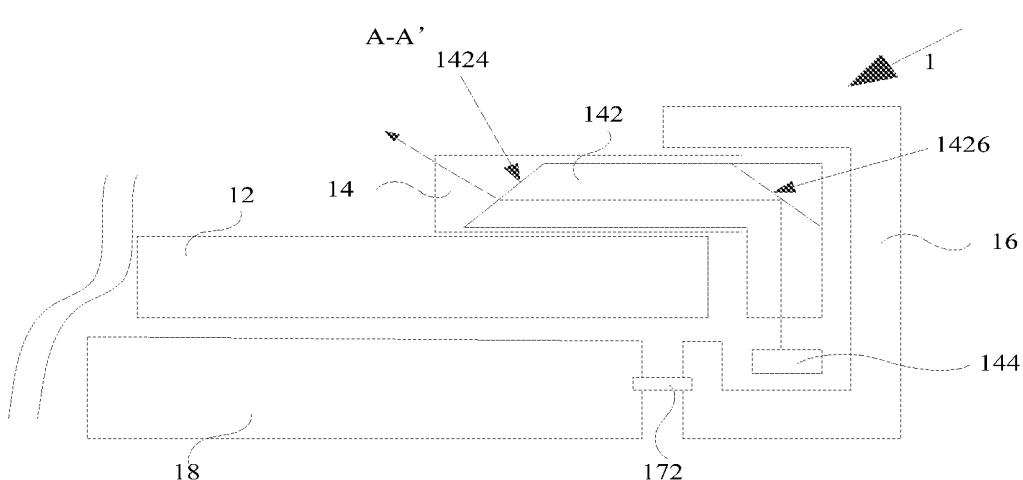
FIG. 19 is a cross-sectional view of yet further another display apparatus provided by an embodiment of the present disclosure along a cross-section A-A' shown in FIG. 1.

As shown in FIG. 19, in this embodiment, the light guide structure 142 includes a second sub-portion 1430, and third sub-portions 1432 respectively connected to the second sub-portion. One end of the second sub-portion 1430 is cut to form a first chamfered surface 1424, the first chamfered surface 1424 is a refractive surface, the other end of the second sub-portion 1430 is cut to form a second chamfered surface 1426, the second chamfered surface 1426 is a reflective surface, the second chamfered surface 1426 is coated with a reflective coating, and the third sub-portion also has a second chamfered surface 1426 adhered to the second chamfered surface 1426, the second chamfered surface 1426 is coated with a reflective coating, the second chamfered surface 1426 of the third sub-portion 1432 and the second chamfered surface 1426 of the second sub-portion 1430 have the same reflectivity. The second chamfered surface 1426 of the second sub-portion 1430 and the second chamfered surface 1426 of the third sub-portion 1432 are adhered together. The light irradiated on the photosensitive region 1422 is transmitted to the optical device 144 through the refraction of the first chamfered surface 1424 and the reflection of the second chamfered surface 1426. Or, as shown in FIG. 19, the direction of the arrow is the direction of light transmission, and the light emitted from the emitting end is transmitted to the external environment through the reflection of the second chamfered surface 1426 and the refraction of the first chamfered surface 1424.

In this embodiment, the light guide structure 142 includes a second sub-portion 1430, and third sub-portions 1432 respectively connected to the second sub-portion. One end of the second sub-portion 1430 is cut to form a first chamfered surface 1424, and the first chamfered surface 1424 is a refractive surface. The other end of the second sub-portion 1430 is cut to form a second chamfered surface 1426, and the second chamfered surface 1426 is a refractive surface. The third sub-portion also has a second chamfered surface 1426 adhered to the second chamfered surface 1426. The second chamfered surface 1426 of the third sub-portion 1432 and the second chamfered surface 1426 of the second sub-portion 1430 have the same reflectivity. The second chamfered surface 1426 of the second sub-portion 1430 and the second chamfered surface 1426 of the third sub-portion 1432 are adhered together. The light irradiated on the photosensitive region 1422 is transmitted to the optical device 144 through the refraction of the first chamfered surface 1424 and the second chamfered surface 1426.

In this embodiment, the light guide structure 142 is in a bar shape, and the light guide structure 142 has a first chamfered surface 1424 corresponding to the photosensitive area 1422, the first chamfered surface 1424 is a reflective surface, and the first chamfered surface 1424 is coated with a reflective coating, thereby increasing the reflectivity of the first chamfered surface 1424. In this way, the light irradiated on the photosensitive area 1422 is transmitted to the optical device 144 through the reflection of the first chamfered surface 1424.

In this embodiment, the light guide structure 142 is in a bar shape, and the light guide structure 142 has a first chamfered surface 1424 corresponding to the photosensitive area 1422, and the first chamfered surface 1424 is a refractive surface, so that the light irradiated on the photosensitive area 1422 is transmitted to the optical device 144 through the refraction of the first chamfered surface 1424.

In this embodiment, an opaque reflective layer is provided in the frame 14 and below the frame 14.

In an embodiment of the present disclosure, an opaque reflective layer is provided in the frame 14 and below the frame 14, and the opaque reflective layer faces upward, thereby preventing a portion of the display panel 12 below the frame and covered by the frame from being seen from the outside.

Figure 15A:
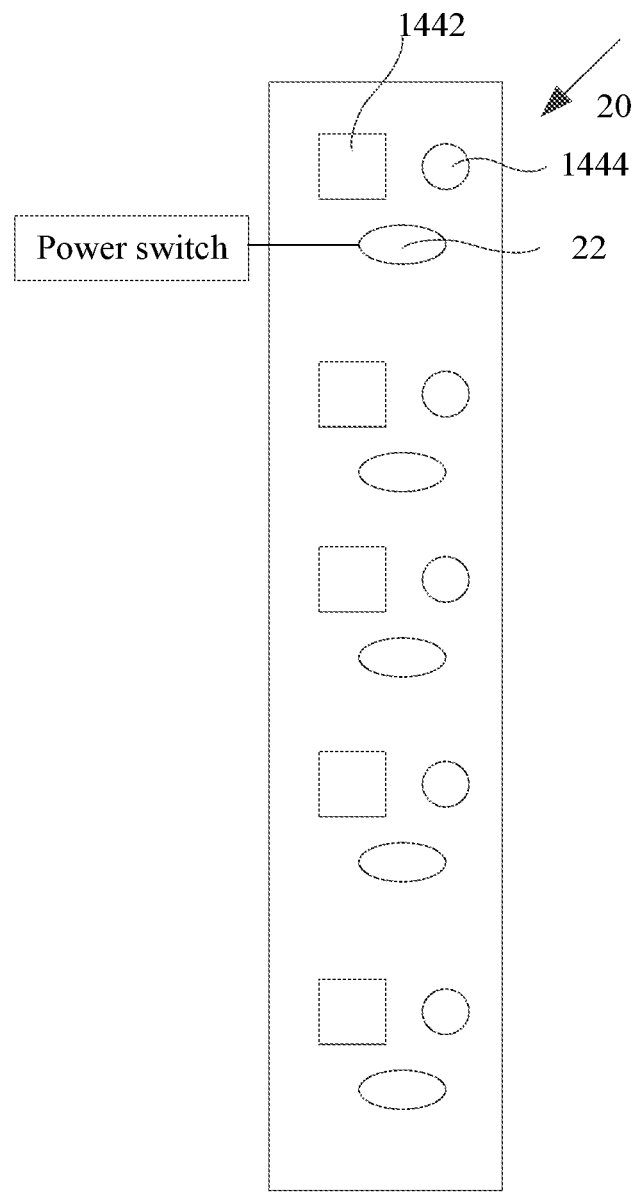
FIGS. 15A and 15B are schematic structural diagrams of another printed circuit board provided by an embodiment of the present disclosure.
Figure 15B:
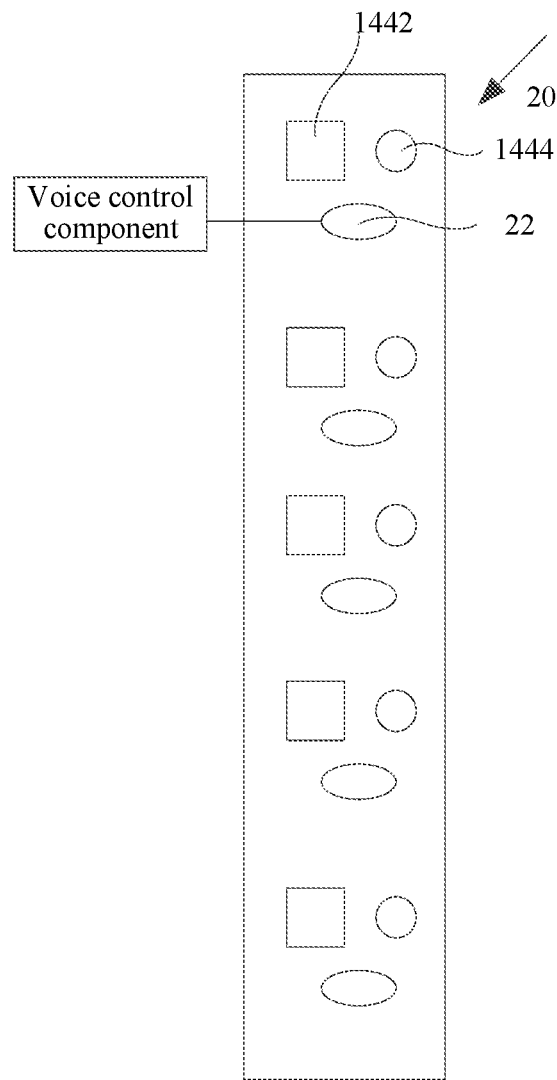
Figure 16:
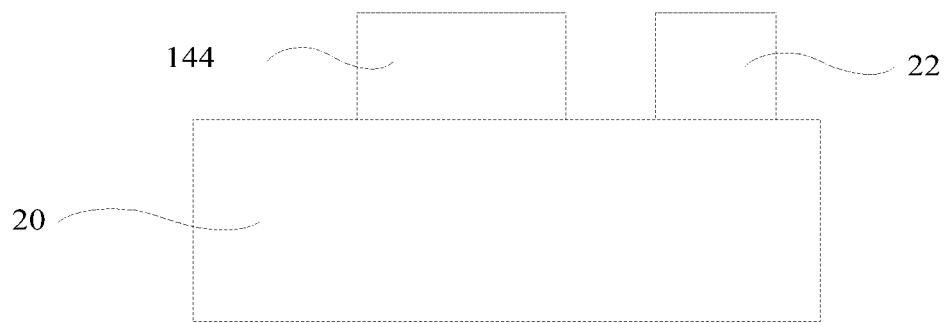
FIG. 16 is a schematic structural diagram of yet another printed circuit board provided by an embodiment of the present disclosure.

As shown in FIGS. 15A, 15B, and 16, in this embodiment, it further includes a warning light 22 configured to emit light so that the light emitted by the warning light 22 is transmitted to external environment through the light guide structure 142.

The warning light 22 is connected to a power switch of the display apparatus 1, and is configured in such a way that the warning light emits light when the power switch is energized; or, the display apparatus 1 further comprises a voice control component, the voice control component is connected to the warning light 22, and is configured so that the warning light 22 emits light when the voice control component is triggered.

In the embodiments of the present disclosure, it further includes a warning light 22 configured to emit light. The warning light 22 is connected to the control module, and the control module is configured to control the warning light 22 to be stopped from power supply after a predetermined time. The warning light 22 is connected to the power switch of the display apparatus 1, that is, after the display apparatus 1 is turned on, the warning light is turned on, the light emitted by the warning light 22 is transmitted to the outside through the light guide structure, and the warning light 22 is turned off after a predetermined time, to prompt the user that the display apparatus 1 has been turned on.

According to some embodiments of the present disclosure, the display apparatus 1 further includes a voice control component, which is connected to the warning light 22. When the voice control component is triggered, the warning light 22 emits light, and the light emitted by the warning light is transmitted to the outside through the light guide structure, the warning light is turned off after a predetermined time, to prompt the user that the display apparatus 1 has been turned on.

As shown in FIG. 10, FIG. 11, and FIGS. 17 to 19, in this embodiment, the display apparatus 1 further includes a back cover 18 and an outer casing 16, the outer casing 16 is provided at the side part of the frame 14, and the back, cover 18 is provided below the display panel 12, and the outer casing 16 is fixedly connected to the back cover 18.

The outer casing 16 wraps apart of the frame away from the display panel, thereby fixing the outer casing to the frame, and the light-transmitting area, of the frame is exposed relative to the outer casing, so that the light can be irradiated on the light-transmitting area.

As shown in FIG. 10, in some embodiments of the present disclosure, the outer casing 16 comprises a first cavity with an opening formed by a first side 162, a second side 164, and a third side 166, and the first side 162 and the third side 166 are respectively provided at both ends of the second side 164, the third side 166 is fixedly connected to the back cover 18, and the optical device 144 and the end of the light guide structure 142 away from the photosensitive area 1422 are located in the first cavity. When the light guide structure 142 is in a bar shape, the first side 162, the second side 164, and the third side 166 are straight plates to form a U-shaped structure; here, the straight plate represent straight wall.

Figure 17:
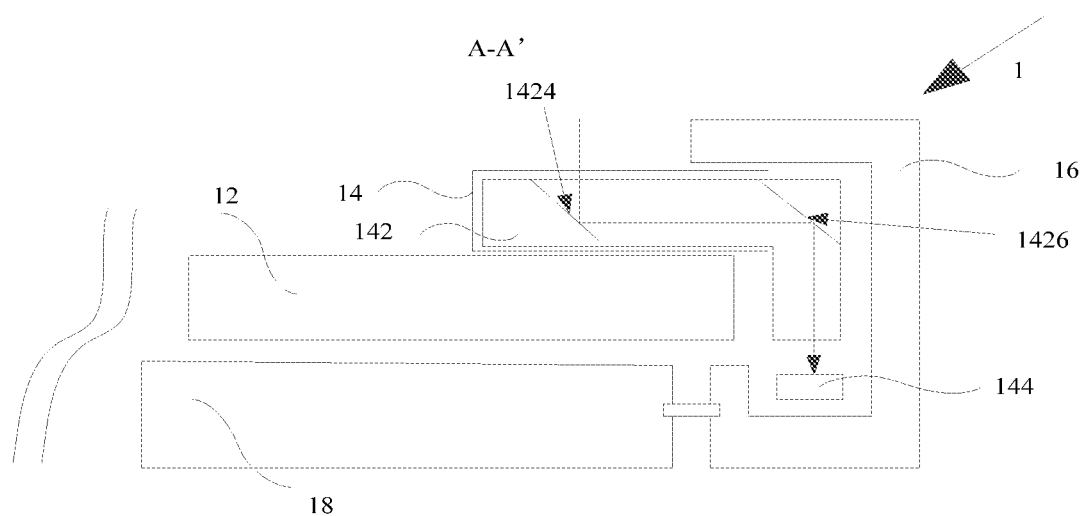
FIG. 17 is a cross-sectional view of yet another display apparatus provided by embodiment of the present disclosure along a cross-section A-A' shown in FIG. 1.

As shown in FIG. 17, in some embodiments of the present disclosure, the outer casing 16 includes a first cavity with an opening formed by a first side 162, a second side 164, and a third side 166. The first side 162 and the third side 166 are respectively provided at both ends of the second side 164, and the third side 166 is fixedly connected to the back cover 18. The optical device 144 and the end of the light guide structure 142 away from the photosensitive area 1422 are located in the first cavity. When light guide structure 142 is in a bent shape, the first side 162 and the second side 164 are straight plates, the third side 166 is an L-shaped plate, a hook of the L-shaped plate is located at the end of the L-shaped plate away from the second side 164 and is connected to the back cover 18.

As shown in FIG. 18, in still other embodiments of the present disclosure, the outer casing 16 includes an L-shaped structure formed by a fourth side 168 and a fifth side 170. The fourth side 168 is located above the side part of the frame 14, and the fifth side 170 is fixedly connected to the back cover 18, and the optical device 144 and the end of the light guide structure 142 away from the photosensitive area 1422 are located in a second cavity formed by the L-shaped structure and the back cover 18.

As shown in FIG. 19, in the embodiment of the present disclosure, the outer casing 16 and the back cover 18 are fixedly connected by a fixing member. The fixing member may be a clamping block 172. A connection portion between the back over 18 and the outer casing 16 is provided with a first clamping slot and a second clamping slot, and the clamping block 172 is clamped into the first clamping slot and the second clamping slot, so as to realize the fixed connection of the outer casing 16 and the back cover 18.

The fixing member may also be an L-shaped fastener 174, one end of the L-shaped fastener is fixedly connected to the back cover 18, and the other end of the L-shaped fastener 174 is fixedly connected to the outer casing 16, thereby realizing the fixed connection of the outer casing 16 and the back cover 18.

According to some embodiments of the present disclosure, the entire frame is the light-transmitting area, and the entire frame is made of a transparent material.

According to some embodiments of the present disclosure, a light-transmitting area may be coated with a light-transmitting coating, so that the light-transmitting area is completely the same as other opaque areas, making the display apparatus 1 more beautiful.

According to some embodiments of the present disclosure, the display apparatus 1 is a painted screen. The display apparatus 1 can also be other apparatuses for display, as long as they are suitable for the above embodiments.

According to some embodiments of the present disclosure, the outer casing 16 is a wooden frame, which makes the painted screen more beautiful.

The display apparatus 1 proposed by embodiments of the present disclosure includes a display panel 12 and a frame 14. The frame 14 includes a light-transmitting area. The light-transmitting area is made of a transparent material, so that light can be irradiated on the photosensitive area 1422 through the light-transmitting area, and then the light guide structure 142 transmits the light irradiated on the photosensitive area 1422 to the optical device 144. When a gesture operation is performed on the photosensitive areas 1422 of the light guide structures 142, the plurality of optical devices 144 respectively receive corresponding optical signals to enable the display panel 12 to display accordingly. Compared with the related art, in the present application, the frame 14 does not need to be opened with holes, and can realize the control of the displaying of the display panel 12 through optical gesture operations, maintaining integrity of the frame 14 of the display apparatus 1, and making the display apparatus 1 more beautiful.

The display apparatus proposed by embodiments of the present disclosure includes a display panel and a frame. The frame is provided on the side part of the display panel. The frame includes a light-transmitting area. The light-transmitting area is made of a transparent material. A plurality of light guide structures are provided in the frame. The photosensitive area provided at one end of each light guide structure is provided below the light-transmitting area, so that light can irradiate on the photosensitive area of the light guide structure through the light-transmitting area, thereby the light irradiated on the photosensitive area is transmitted to the optical device at the other end of the light guide structure through the light guide structure, achieving the receiving of the optical signal by the optical device.

There are a plurality of light guide structures, and the plurality of light guide structures are arranged at intervals. When the user performs a gesture operation, the photosensitive areas of the plurality of light guide structures will be blocked in sequence, and the intensity of light sensed by the photosensitive area blocked by the gesture change. Thus, the plurality of light guide structures will sequentially transmit the changed light to the corresponding optical devices, the plurality of optical devices receive the changed optical signals sequentially, and then the plurality of optical devices convert the changed optical signals into changed electrical signals, and transmit them to the printed circuit board, and the printed circuit board controls the display panel to display corresponding to the gesture operation according to the changed electrical signals received in sequence, thereby the control of the display of the display panel is achieved through optical gesture operations. Therefore, compared with the related art, the display apparatus provided in the present application can realize the corresponding display control of the display panel through optical gesture operations without opening holes in the frame, ensuring the integrity of the frame. The integrity of the frame is still maintained when the display control of the display apparatus is achieved, making the display apparatus more beautiful and improving the user experience.

The above are only specific embodiments of the present disclosure, but the protection scope of the present disclosure is not limited to this, and any person skilled in the art can easily think of changes or replacements within the technical scope disclosed in the present disclosure. These changes or replacements should be covered by the protection scope of the present disclosure. Therefore, the protection scope of the present disclosure shall be defined by the claims.

What is claimed is:

1. A display apparatus, comprising:
   a display panel;
   a frame, provided at a side part of the display panel and comprising a light-transmitting area;
   a plurality of light guide structures spaced apart from each other, one end of each light guide structure having a photosensitive area, the photosensitive area being provided opposite to the light-transmitting area so that light is irradiated on the photosensitive area through the light-transmitting area; and
   an optical device provided at an end of each light guide structure away from the photosensitive area,
   wherein each of the light guide structures is configured to transmit the light irradiated on the photosensitive area to the optical device; and
   wherein the light guide structure is in a bar shape, the light guide structure has a first chamfered surface corresponding to the photosensitive area, and the first chamfered surface is configured to transmit the light irradiated on the photosensitive area to the optical device.

2. The display apparatus according to claim 1, wherein the frame comprises a first frame, and some of the plurality of the light guide structures are provided in the first frame, and distances between the photosensitive areas of the plurality of light guide structures and a side edge of the first frame are not exactly the same.

3. The display apparatus according to claim 2, wherein the frame comprises adjacent first frame and second frame, some of the plurality of the light guide structures are provided in both the first frame and the second frame, and distances between the photosensitive areas of the plurality of light guide structures and a side edge of the corresponding frame where the photosensitive areas of the plurality of light guide structures are located are the same.

4. The display apparatus according to claim 2, wherein the frame further comprises a second frame adjacent to the first frame, and some other of the plurality of the light guide structures are provided in the second frame.

5. The display apparatus according to claim 4, wherein the optical device comprises a transmitting component and a switching component; the display apparatus further comprises a switching control component connected to the switching component and configured to control a switching state of the switching component; the transmitting component is connected to the switching component, and the switching component is configured to control the transmitting component to emit light so as to transmit the light emitted by the transmitting component to external environment through one of the plurality of light guide structures; or,
   the optical device comprises a receiving component, a transmitting component, and a control circuit connected to the receiving component and the transmitting component, and the control circuit is configured to control the transmitting component to emit light in response to the receiving component not receiving an optical signal.

6. The display apparatus according to claim 4, wherein an opaque reflective layer is provided in the first frame or the second frame, and the opaque reflective layer is located between the display panel and the light guide structure.

7. The display apparatus according to claim 4, wherein the frame comprises adjacent first frame and second frame, some of the plurality of the light guide structures are provided in both the first frame and the second frame, and distances between the photosensitive areas of the plurality of light guide structures and a side edge of the corresponding frame where the photosensitive areas of the plurality of light guide structures are located are the same.

8. The display apparatus according to claim 1, wherein the frame comprises adjacent first frame and second frame, some of the plurality of the light guide structures are provided in both the first frame and the second frame, and distances between the photosensitive areas of the plurality of light guide structures and a side edge of the corresponding frame where the photosensitive areas of the plurality of light guide structures are located are the same.

9. The display apparatus according to claim 1, wherein the display apparatus further comprises an opaque reflective layer disposed between the display panel and one of the plurality of light guide structures.

10. The display apparatus according to claim 1, further comprising:
    a warning light configured to emit light so that the light emitted by the warning light is transmitted to external environment through one of the plurality of light guide structures;
    wherein the warning light is connected to a power switch of the display apparatus, and is configured in such a way that the warning light emits light in response to the power switch being energized; or, the display apparatus further comprises a voice control component, the voice control component is connected to the warning light, and is configured in such a way that the warning light emits light in response to the voice control component being triggered.

11. The display apparatus according to claim 1, wherein the display apparatus further comprises a back cover and an outer casing, the outer casing is provided at a side part of the frame, the back cover is provided below the display panel, and the outer casing is fixedly connected to the back cover;
    the outer casing comprises a first cavity with an opening formed by a first side, a second side, and a third side, and the first side and the third side are respectively provided at both ends of the second side, the third side is fixedly connected to the back cover, and the optical device and an end of the light guide structure away from the photosensitive area are located in the first cavity.

12. The display apparatus according to claim 11, wherein the first side, the second side, and the third side are straight plates, to form a U-shaped structure; or
    the first side and the second side are straight plates, and the third side is an L-shaped plate, and an end of the L-shaped plate away from the second side is connected to the back cover.

13. The display apparatus according to claim 11, wherein the outer casing and the back cover are fixedly connected by a fixing member;
    the fixing member is a clamping block, and a connection portion between the back cover and the outer casing is provided with a first clamping slot and a second clamping slot, and the clamping block is clamped in the first clamping slot and the second clamping slot; or, the fixing member is an L-shaped fastener, and the L-shaped fastener comprises two straight walls, wherein one of the straight walls of the L-shaped fastener is fixedly connected to the back cover, and the other of the straight walls of the L-shaped fastener is fixedly connected to the outer casing.

14. The display apparatus according to claim 1, wherein the display apparatus further comprises a back cover and an outer casing, the outer casing is provided at a side part of the frame, the back cover is provided below the display panel, and the outer casing is fixedly connected to the back cover;

the outer casing comprises an L-shaped structure formed by a fourth side and a fifth side, the fourth side is located above the side part of the frame, the fifth side is fixedly connected to the back cover, and the optical device and an end of the light guide structure away from the photosensitive area are located in a second cavity formed by the L-shaped structure and the back cover.

15. The display apparatus according to claim 1, wherein the frame further comprises an opaque area, and the light-transmitting area is coated with a light-transmitting coating, so that the light-transmitting area and the opaque area have the same color.

16. A display apparatus, comprising:
a display panel;
a frame, provided at a side part of the display panel and comprising a light-transmitting area;
a plurality of light guide structures spaced apart from each other, one end of each light guide structure having a photosensitive area, the photosensitive area being provided opposite to the light-transmitting area so that light is irradiated on the photosensitive area through the light-transmitting area; and
an optical device provided at an end of each light guide structure away from the photosensitive area,
wherein each of the light guide structures is configured to transmit the light irradiated on the photosensitive area to the optical device; and
the light guide structure is in a bent shape, the light guide structure has a first chamfered surface corresponding to the photosensitive area, a bend of the light guide structure is provided with a second chamfered surface, the first chamfered surface is configured to transmit the light irradiated on the photosensitive area to the second chamfered surface, and the second chamfered surface is configured to transmit the received light to the optical device.

17. The display apparatus according to claim 16, wherein
one end of the light guide structure is cut to form the first chamfered surface, and the bend of the light guide structure is cut to form the second chamfered surface; or, the light guide structure is formed by connecting a first sub-portion with a second sub-portion with a bent shape, the first sub-portion is connected to one end of the second sub-portion, a connection surface of the first sub-portion and the second sub-portion is the first chamfered surface, and the bend of the second sub-portion is cut to form the second chamfered surface; or, the light guide structure is formed of a first sub-portion, a second sub-portion with a bent shape, and a third sub-portion, the first sub-portion is connected to one end of the second sub-portion, the third sub-portion is connected to the bend of the second sub-portion, a connection surface of the first sub-portion and the second sub-portion is the first chamfered surface, and a connection surface of the second sub-portion and the third sub-portion is the second chamfered surface.

18. The display apparatus according to claim 17, wherein the first chamfered surface is a refractive surface, and the first chamfered surface is configured to refract light irradiated on the photosensitive area; or the first chamfered surface is a reflective surface, and the first chamfered surface is configured to reflect light irradiated on the photosensitive area; and the reflective surface is coated with a reflective coating.

19. The display apparatus according to claim 18, wherein the second chamfered surface is a refractive surface, and the second chamfered surface is configured to refract the received light; or the second chamfered surface is a reflective surface, and the second chamfered surface is configured to reflect the received light; and the reflective surface is coated with a reflective coating.

* * * * *